Feb. 12, 1946.  R. C. SHOEMAKER  2,394,940
TRUCK LOADER
Filed Dec. 14, 1942  6 Sheets-Sheet 2
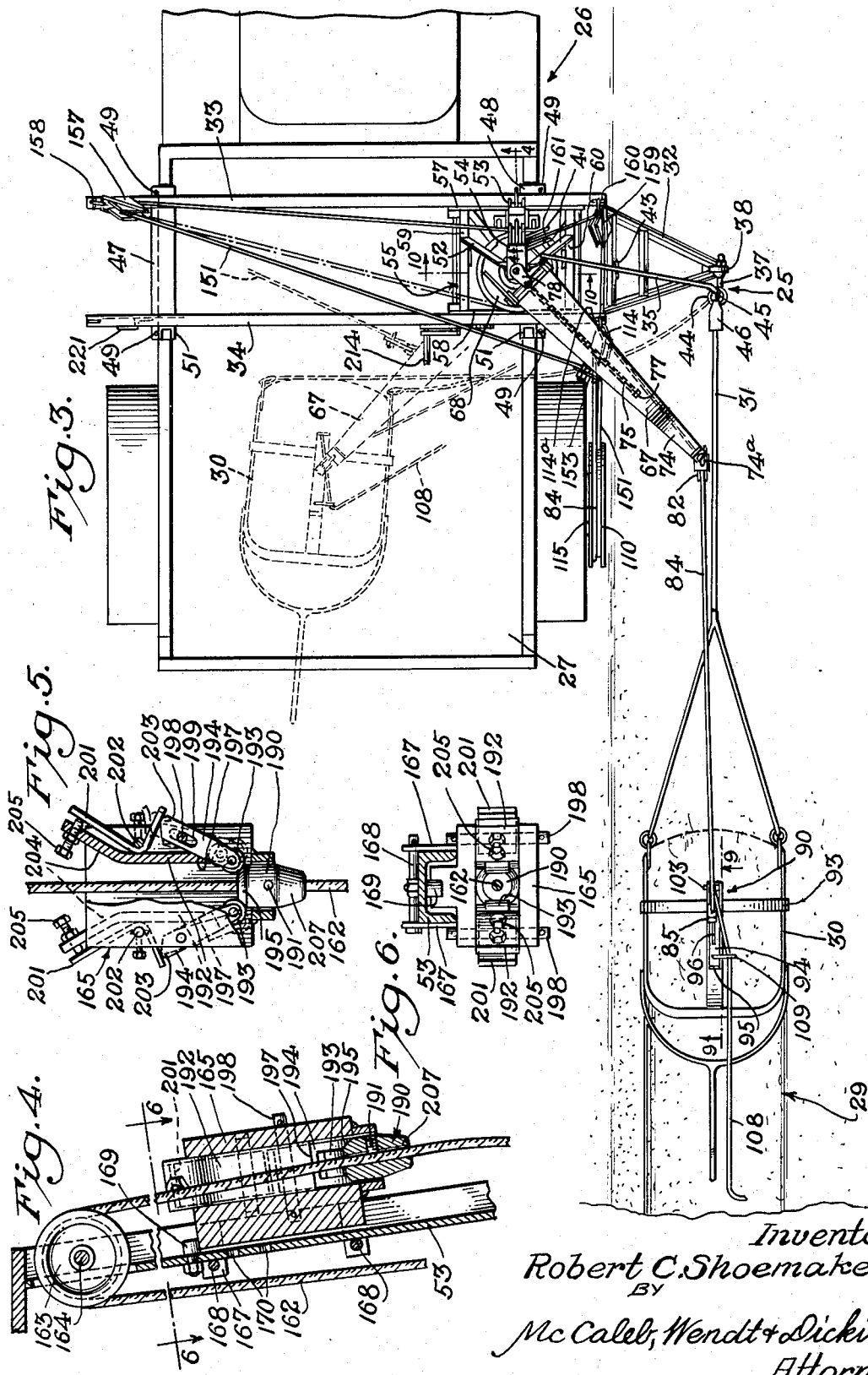
Inventor
Robert C. Shoemaker
BY
McCaleb, Wendt & Dickinson
Attorneys.

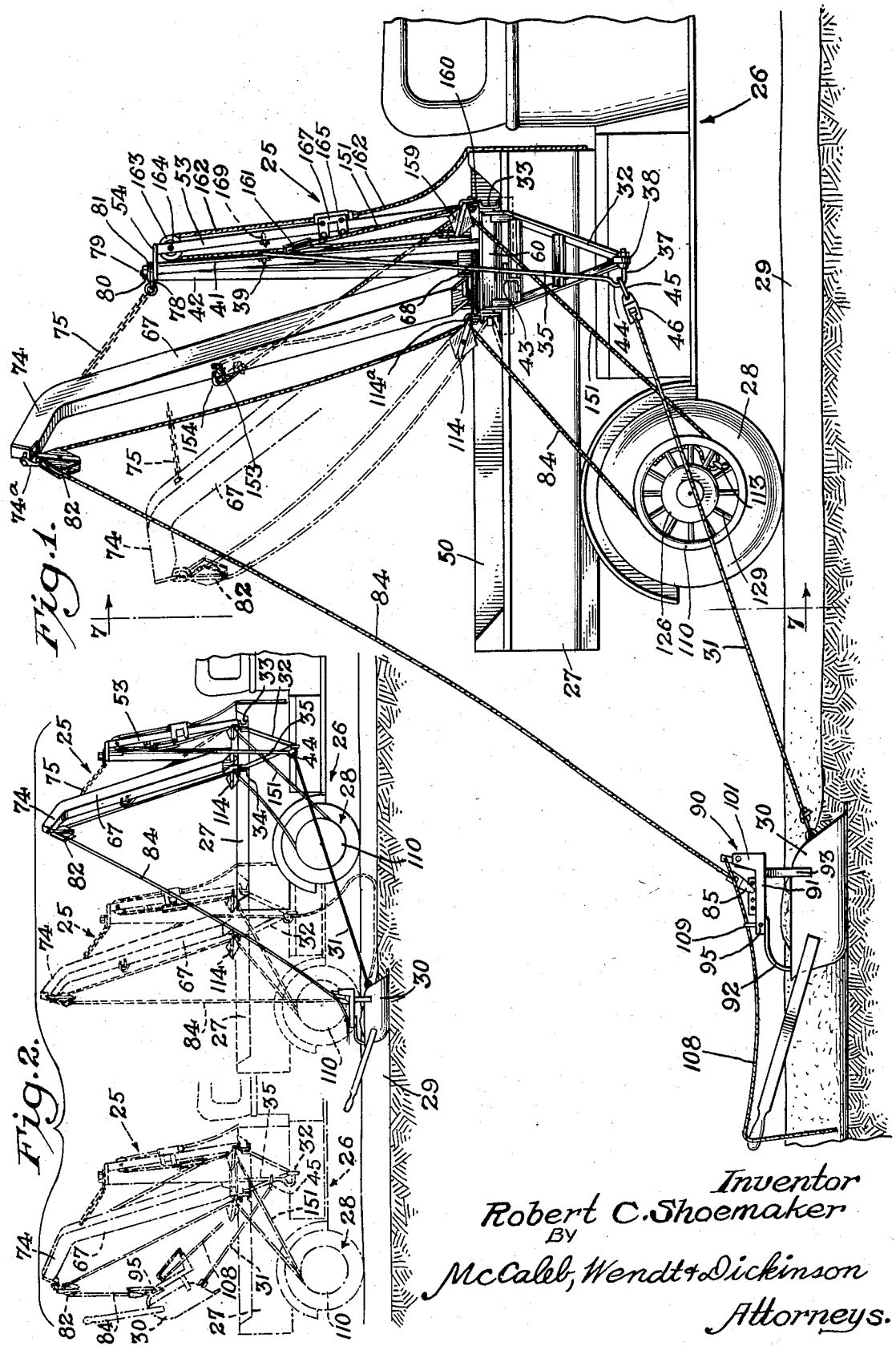

Feb. 12, 1946.  R. C. SHOEMAKER  2,394,940
TRUCK LOADER
Filed Dec. 14, 1942  6 Sheets-Sheet 3
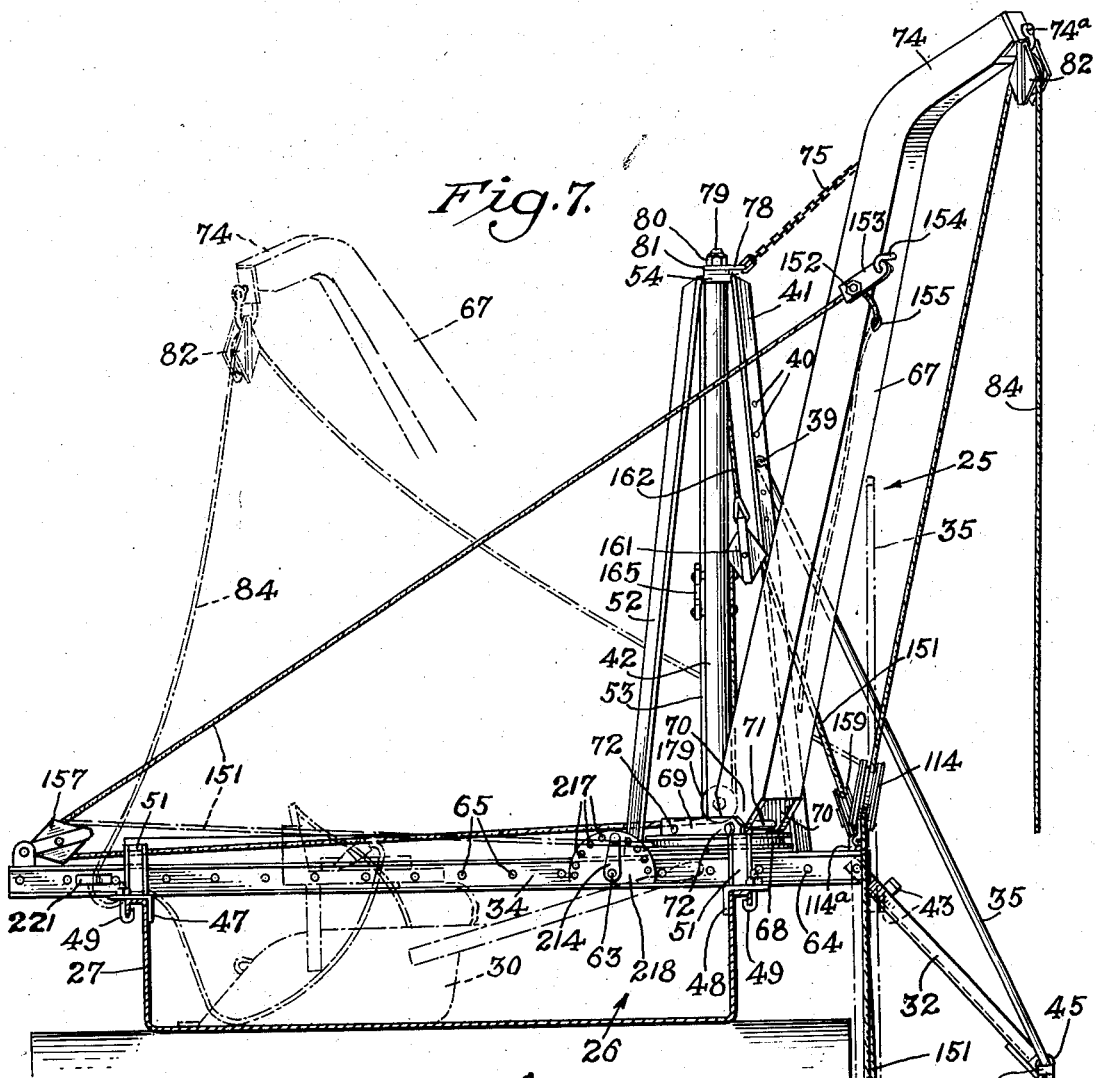
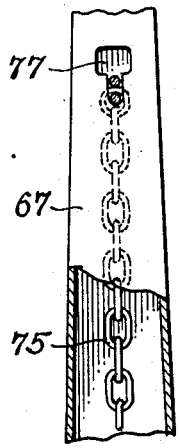
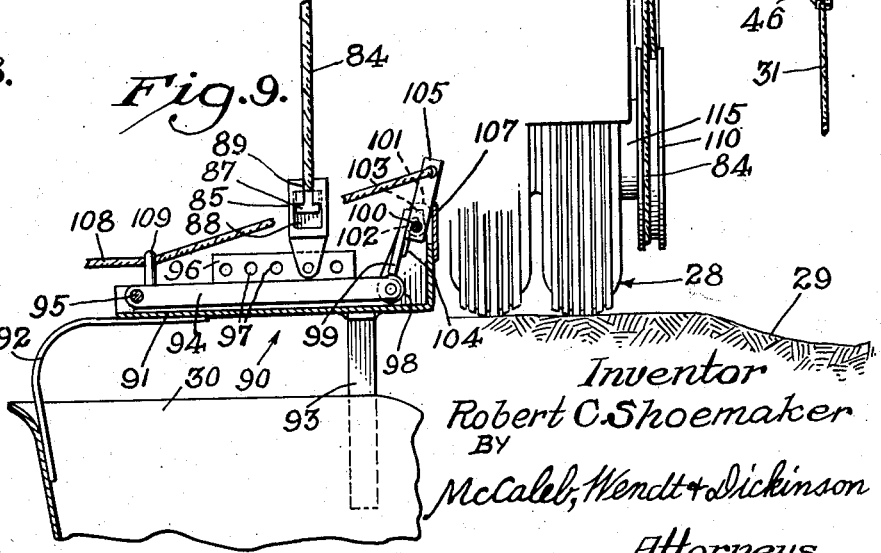
Inventor
Robert C. Shoemaker
BY
McCaleb, Wendt & Dickinson
Attorneys.

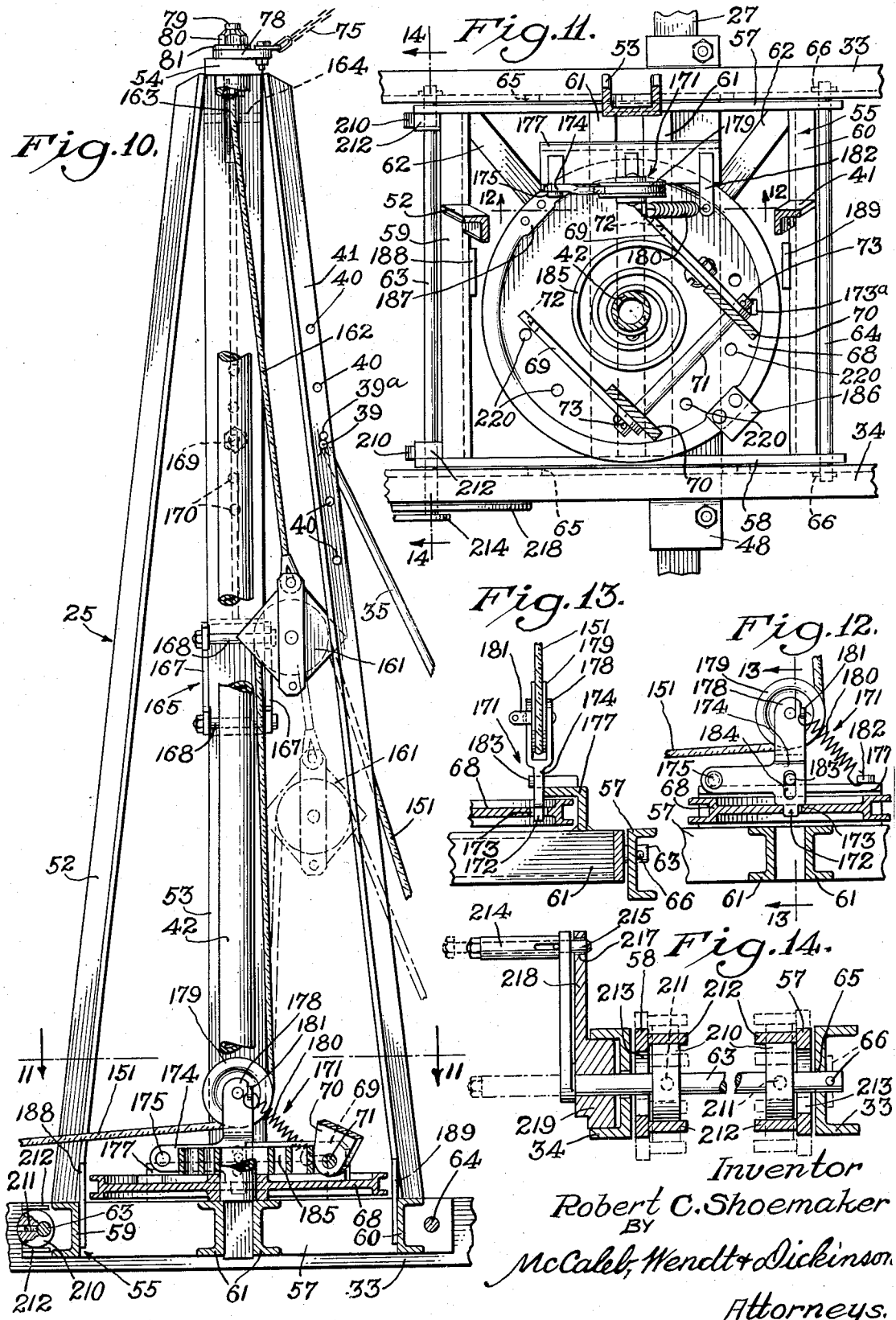

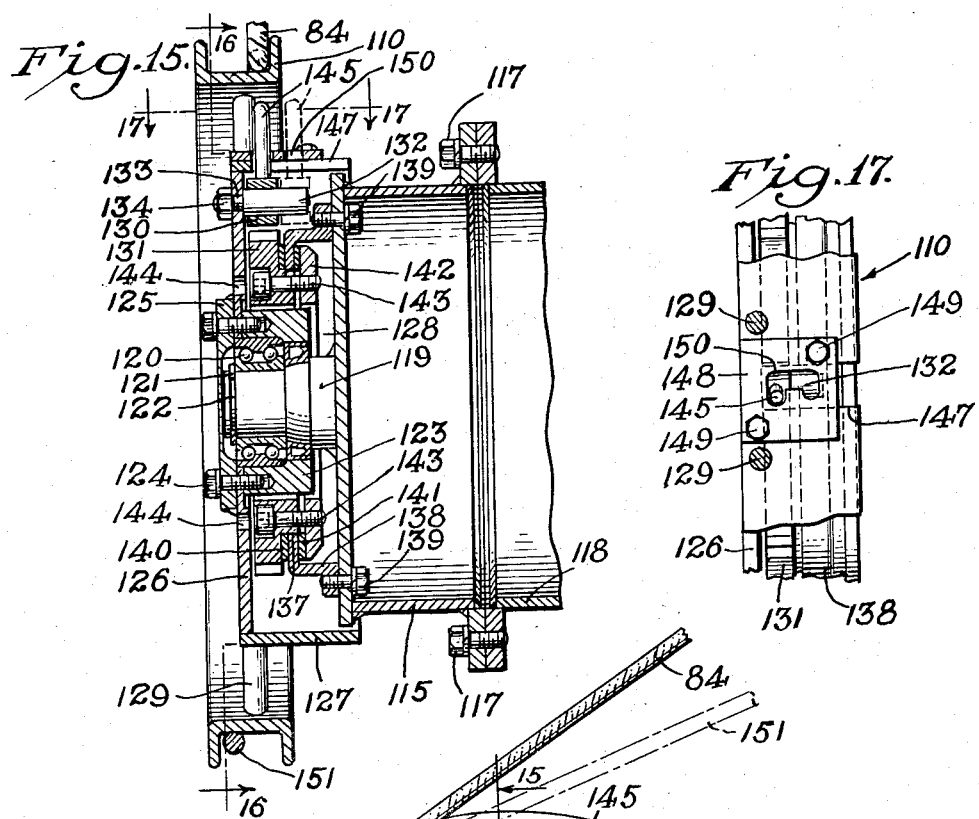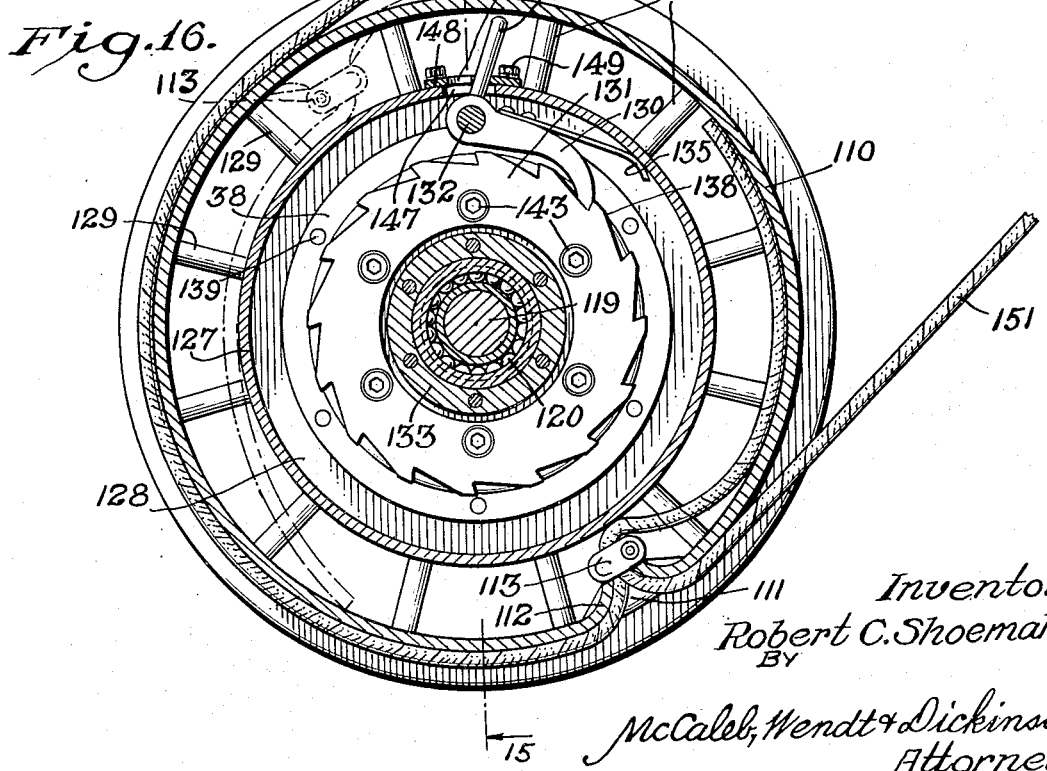

Feb. 12, 1946. R. C. SHOEMAKER 2,394,940
TRUCK LOADER
Filed Dec. 14, 1942 6 Sheets-Sheet 6

Inventor
Robert C. Shoemaker
BY
McCaleb, Wendt & Dickinson
Attorneys.

Patented Feb. 12, 1946

2,394,940

UNITED STATES PATENT OFFICE 2,394,940

TRUCK LOADER

Robert C. Shoemaker, Portland, Oreg., assignor to Willamette Hyster Company, Portland, Oreg., a corporation of Oregon Application December 14, 1942, Serial No. 468,927

28 Claims. (Cl. 214—81)

This invention relates to improved truck loading apparatus, and more particularly to such apparatus which is transportably mounted upon and is operated by movement of the truck, or to be more explicit, it is operated by the forward and reverse rotations of one of the wheels of the truck.

Such apparatus may be installed as a component of a truck at the factory, but conveniently takes the form of a unitary attachment designed to be mounted by or for the user upon an existing truck. The apparatus includes a supporting structure; a material handling device such as a slip scraper bucket, rock fork, cradle or the like; means for actuating the material handling device to move back and forth between material engaging or receiving and truck loading positions; and means connected up with a wheel of the truck and responsive to rotation of the wheel in respective opposite directions to operate the actuating means. Thus, where the apparatus is equipped with a slip scraper bucket, forward movement of the truck may be utilized to deliver the bucket into material-engaging position at the side of the truck and also to drag the bucket forwardly for scraping up a fill of the material while rearward movement of the truck is utilized to effect raising up and swinging of the bucket into a position over the truck body where the material may be loaded into the truck by dumping the bucket.

One of the principal objects of my invention is to improve the construction and operation of truck loading apparatus of this character, with particular regard to improvements in the means for actuating and controlling operation of the load handling device of the apparatus.

Another object is to provide an improved loading apparatus having a plurality of actuating cables arranged for operation in a novel manner for effecting sequential and coordinated vertical and horizontal movement of the load handling device of the apparatus.

Another object is to provide an improved wheel-mounted, independently rotatable cable winding drum structure and novel means for releasably connecting the drum structure for rotation with the wheel.

Still another object is to provide safety means for preventing damage to the truck loading apparatus from excessive tension in the actuating cable structure such as may result from over-running of the truck wheel with which there is a cable motivating connection.

A further object of the invention is to provide an improved truck mounted derrick-type loader in which the swinging axis of the hoisting boom is adjustable to compensate for undesirable unbalancing of the boom due to tilting of the truck, and, optionally, to predispose the boom to swing in given direction.

Another object of the invention is to provide an improved drag bar structure for use with a slip scraper bucket type of material handling device in a truck carried loader.

Another object is to provide improved means for quick-releasably connecting the material handling device in the apparatus.

Other objects and advantages of the invention will be apparent from the following description and the accompanying drawings, in which similar characters of reference indicate similar parts throughout the several views.

In the drawings:

Figure 1 is a fragmentary and more or less schematic view of a small size standard dump truck having mounted thereon a loader embodying the features of my invention;

Fig. 2 is a similar view on a reduced scale showing various operative positions of the loader;

Fig. 3 is a top plan view of the loader;

Fig. 4 is an enlarged fragmental vertical sectional view taken substantially on the line 4—4 of Fig. 3 showing details of the safety release counterweight construction for the swing cable slack take-up;

Fig. 5 is a front elevational view of the safety release counterweight structure partially broken away and in section for clarity of detail;

Fig. 6 is a horizontal sectional detail view taken substantially in the plane of line 6—6 of Fig. 4;

Fig. 7 is a rear elevational view taken substantially from the position of line 7—7 of Fig. 1, looking forwardly toward the truck-mounted parts of the loader;

Fig. 8 is an enlarged fragmentary elevational view of the rear side of the hoisting boom showing the manner in which the adjustable stay chain is connected therewith;

Fig. 9 is a vertical sectional view taken in substantially the plane of line 9—9 of Fig. 3 showing, on an enlarged scale, details of the trip latch mechanism and quick detachable cable connector of the slip scraper bucket;

Fig. 10 is an enlarged vertical sectional detail view taken substantially in the plane of line 10—10 of Fig. 3 to show details of the mast and swivel mounting structures for the boom;

Fig. 11 is a horizontal sectional plan view taken substantially in the plane of line 11—11 of Fig. 10;

Fig. 12 is a fragmentary vertical sectional view taken substantially in the plane of line 12—12 of Fig. 11 showing details of the boom latch;

Fig. 13 is a vertical sectional detail view taken in the plane of line 13—13 of Fig. 12;

Fig. 14 is an enlarged fragmental vertical sectional detail view, taken substantially along the line 14—14 of Fig. 11, showing the boom tilting adjuster;

Fig. 15 is a vertical diametrical sectional view through the winding drum structure, taken substantially in the plane of line 15—15 of Fig. 16;

Fig. 16 is a vertical sectional view through the winding drum structure, taken substantially along lines 16—16 of Fig. 15;

Fig. 17 is a horizontal fragmentary detail sectional view, taken substantially in the plane of line 17—17 of Fig. 15 and showing the clutch-handle keeper plate;

Figure 18:
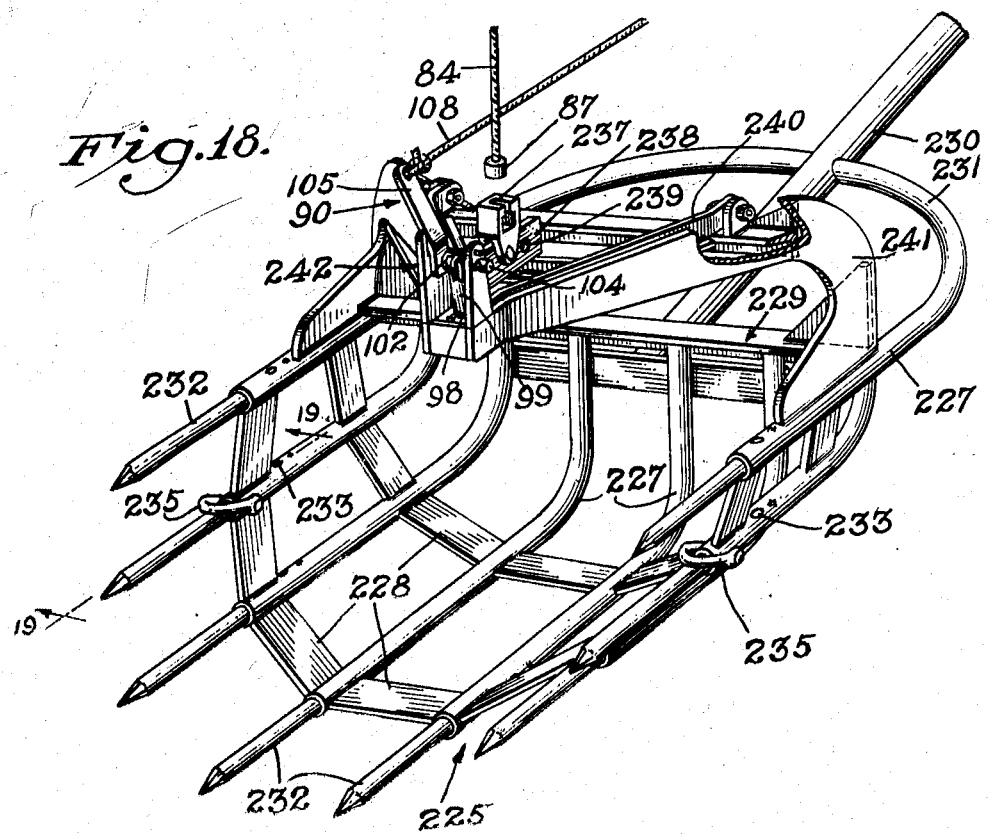
Fig. 18 is a perspective view of an optional rock fork which is adapted to be used with the loader.

By way of illustration, the features of the invention are shown in the drawings as embodied in a truck loader, generally identified by the numeral 25, of a substantially self-contained unitary construction which is arranged to be removably mounted upon a dump truck 26. In the present instance the truck 26 is of the type which may be employed by highway maintenance crews, including a rearwardly tiltable open top dump body 27 located to a large extent above the rear driving wheels. Merely one of the rear wheels, at the right side of the truck, is shown and identified generally by the numeral 28.

The loader 25 is equipped to receive material at ground level and hoist it up into the truck body 27, being here shown (Figs. 1, 2 and 3) as especially adapted for digging or scraping out roadside ditches, such as that indicated at 29. For this purpose the loader has a slip scraper bucket 30 which is adapted to be dragged along the ditch under the guidance of a scraper attendant to dislodge and gather up material to be cleaned out of the ditch 29 and loaded into the truck body 27.

Forward motion of the truck 26 is utilized for dragging the bucket 30 along within the ditch 29 to cause it to gather a load of material. For this purpose a drag line cable 31 has a forked tail secured to the respective opposite sides of the mouth of the bucket 30 and has its forward end connected to the outer end of a drag bar 32. As best seen in Figs. 1, 3 and 7, the drag bar 32 comprises an elongated, reenforced angle bar frame of preferably triangular or A-shape which extends laterally at a downwardly slanting angle from the forward end of the truck body 27 with the pointed end of the frame as low as practicable to minimize the upward component of pulling force when dragging the bucket. At its upper, wider end the drag bar 32 has its legs pivotally secured to the inside faces or opposing backs of horizontally spaced, coextensively parallel front and rear mounting frame bars 33 and 34, respectively, of preferably channel shape, whch lie transversely of the truck body and have their ends projecting to a predetermined extent beyond the opposite sides of the truck body.

While it is generally desirable to have the outer end of the drag bar 32 as low as practicable in order to minimize the angle between the drag line 31 and the ground during a scraping operation, it nevertheless may be desirable from time to time to vary the elevation of the lower end or at least vary the distance to which such end extends from the side of the truck to accommodate various operational circumstances, as may be done by adjustably swinging the bar about its pivotal axis. Means for holding the drag bar 32 in various swingably adjusted positions comprises a tie rod 35 having its lower extremity directed angularly forwardly to serve as a bearing pin 37 which is pivotally connected into an eye 38 at the point end of the drag bar frame. At its upper end, the tie rod 35 is formed with a rearwardly extending angular anchoring pin leg 39 arranged to be inserted through any selected one of a vertical series of graduated adjustment-determining holes 40 within the outwardly projecting flange of an angle iron outerstrut 41 associated with a mast 42. A displacement-preventing cotter pin 39ª may be removably inserted through a suitable aperture extending transversely through the outer end of the anchoring leg 39. By removing the cotter pin 39ª and disconnecting the anchoring leg 39, the drag bar 32 may be allowed to hang vertically out of the way at the side of the truck so as to avoid impeding travel of the truck 26 while in transit from place to place. In such event, the tie rod 35 may be collapsed against the drag bar and there held in place by a spring retaining clip 43, as indicated in dot-dash outline in Fig. 7.

Adjacent to the lower bearing pin 37, the tie rod 35 is formed with relatively shallow crook 44 adapted to form a seat for a shackle ring 45 of a quickly separable coupling 46 by which the drag line 31 is connected to the drag bar structure. The shackle ring 45 is adapted to move slidably up along the tie rod 35 under certain conditions as will be more fully explained hereinafter.

The mounting frame bars 33 and 34 are secured together by preferably angle iron cross members 47 and 48 respectively adjacent to the left and right ends of the frame. The cross angles 47, 48 serve as runners (Figs. 3 and 7) which are appropriately spaced to rest upon the upper side edge beads of the truck body 27 to which the runners are removably secured by means such as J-bolts 49.

In order to receive removable side boards 50 forming side wall upward extensions for the body 27, vertically extending, rearwardly opening channel shaped sockets 51 may be mounted upon the rear frame bar 34 over the rear ends of the runners 47 and 48.

The mast 42 forms a component of a derrick structure through the medium of which the filled scraper bucket 30 may be raised into a position over the truck body 27 for loading thereinto of the bucket contents. In the present instance, the mast 42 comprises a tubular post which is adapted to be supported in a rigid vertical position by, in addition, to the strut 41, an opposite or inner strut 52 and a rear strut 53, arranged pyramidally to converge at the top of the mast. At their upper ends, the mast 42 and the struts 41, 52 and 53 are fixedly secured to a horizontal crown plate 54. At their lower ends the mast 42 and the struts are rigidly secured to a base frame 55. The entire mast, strut and base frame structure is preferably welded into a solid unit, which is exceedingly strong, compact and light in weight.

As best seen in Figs. 10 and 11, the base frame 55 preferably comprises a rectangular arrangement adapted to be received between the mounting frame bars 33 and 34. It comprises coextensive, parallel front and rear side bar strips 57 and 58 extending longitudinally along and closely broadside to the frame bars 33 and 34, respectively, and secured into a rigid unit adjacent to their left and right ends by reenforcing channel cross bars 59 and 60, respectively. These cross bars support the respective side struts 52 and 41. Centrally of the base frame, extending in a rigidly secured front to rear direction between the side bars 57 and 58, is a pair of channel bars 61 lying in back-to-back spaced adjacency and providing base support for the mast 42, as well as, in conjunction with the front side plate 57, support for the base end of the strut 53. A pair of diagonal bracing members 62 extend preferably from the forward inner corners of the base frame to the central bars 61.

To secure the frame 55 between the mounting frame bars 33 and 34, supporting pins or shafts 63 and 64 extend slidably through suitable apertures adjacent to the left and right ends, respectively, of the side frame bars 57, 58, and at their ends project out through coaxial pairs of shaft holes 65 formed in the respective webs of the mounting frame bars 33 and 34. The shaft holes 65 are preferably provided in uniform series throughout the length of the mounting frame bars 33 and 34 so that the base frame 55 may be mounted at any of a plurality of selective positions along the mounting frame as required for various practical conditions. Thus, the base frame 55 is adapted to be mounted at the right side of the truck, as shown herein, since the derrick and scraper are to be used at that side of the truck, or the entire arrangement may conveniently be reversed for use at the left side of the truck. Moreover, this arrangement also permits the loader to be used with trucks of various optional widths or under conditions requiring the derrick to be located inwardly from either side of the truck rather than directly over one of the sides as shown. Longitudinal displacement of the mounting shafts 63 and 64 is restrained by means such as cotter pins 66.

By removing one of the cotter pins 66 from the supporting shaft 64, the shaft may be withdrawn and the mast tipped over into an inactive horizontal position by pivoting it on the supporting shaft 63, as may become necessary, due to low headroom, in order to permit the truck to pass through a garage door or a shallow underpass, or the like.

A boom 67 is supported for swinging movement about the vertical axis of the mast 42. In the present instance the boom 67 comprises a tapering tubular structure of rectangular cross-section, thus embodying great strength with a minimum of weight. At its base or heel the boom 67 is mounted upon a swivel member herein comprising a bull wheel 68. As best seen in Figs. 3, 10 and 11, the bull wheel 68 is rotatably mounted coaxial with the base of the mast 42. Rigid upon the upper surface of the bull wheel is a pair of identical elongated boom mounting flanges 69 in the form of identical parallel plates secured in place as by welding along one longitudinal edge on equally spaced opposite chords of the bull wheel, the spacing being such as to permit freely slidable reception at the inside faces of the flanges of depending heel lugs 70 formed as integral parallel extensions of the sides of the boom 67. A heel pin 71 extends through the heel lugs 70 and projects at its opposite end through coaxial apertures 72 adjacent to the ends of mounting flange plates 69. It will be observed that the plates 69 are formed with apertures 72 adjacent to both ends so that the boom may be mounted selectively at either opposite side of the bull wheel. Cotter pins 73 may be utilized to hold the boom pin 71 against longitudinal displacement.

The boom 67 is preferably substantially longer by a third, more or less, than the height of the mast 42 and has its upper end portion formed to extend angularly outwardly from the main body to form an overhanging head 74. Just below the shoulder where the head 74 meets the body of the boom 67, a tie member comprising a chain 75 engages the boom to hold it in a preferred tilted relation to the mast 42. For this purpose the inner or back face of the boom is formed with a bayonet type of slot 77 (Fig. 8) having the larger opening thereof at the top and of sufficient width to enable passage of the horizontally extending chain links freely therethrough, while the smaller portion of the slot extends downwardly therefrom and is only wide enough to receive a vertical flat link of the chain. Thus, a quick detachable connection of the chain with the boom is effected by extending an end portion of the chain through the larger portion of the bayonet slot 77 and then dropping one of the vertical links into the narrow portion of the slot so that the horizontal link immediately inside will holdingly engage the inside face of the boom wall at each side of the narrow portion of the slot. Any excess chain will hang down enclosed within the boom.

At its opposite end, the boom tie chain 75 is detachably anchored to a horizontal plate 78, which is slidably swiveled upon the head plate 54 by means of a rigid stud bolt or pin 79 coaxial with the mast 42. A castle nut 80 threaded on the pin 79 bears against a hold down washer 81 lying on the anchor plate. Through this arrangement the boom 67 is held at the preferred degree of angularity relative to the mast 42, and the angularity may be adjusted by adjusting the chain 75 in the bayonet slot 77. Where, for example, the boom head 74, due to its height, will not pass under an overhead obstruction, which will, however, admit the mast 42, the boom may be dipped until the uppermost point of the head 74 attains the level of the top of the mast (see broken outline position of Figs. 1 and 7), being tied in this position by appropriate interlocking of the chain 75 in the slot 77.

At the tip of the boom head 74 is a shackle 74a swingably suspending a fairlead pulley block 82 for a hoist line cable 84 by which the scraper bucket 30 is adapted to be raised above the truck body 27. The arrangement is preferably such that the boom will extend outwardly and rearwardly at an angle of approximately 45° relative to the side of the truck into an overside hoisting or pickup position (Figs. 1 and 3) wherein the fairlead block 82 is over substantially the longitudinal center of the ditch 29 so that the loaded bucket 30 may be hoisted substantially straight up.

Attachment of the hoist line 84 to the bucket 30 is effected through the medium of a quick separable coupling 85 (Fig. 9) comprising a socket body which may be formed from cast steel and is preferably pivotally attached to the bucket. A lug or ferrule 87 is securely fastened to the end of the hoist line 84 and provides a head of somewhat smaller diameter than the body 85 but of substantially larger diameter than the hoist line. The head 87 is adapted to be received through an opening which will just clear it in one side of the body 85 for entrance into a socket chamber 88. Assembly of the head 87 within the socket chamber 88 is effected by relative lateral assembly movement of the body and head, the adjacent portion of the hoist line 84 being received within an appropriate slot 89 in the top of the body 85. Then by relative opposite longitudinal movement of the hoist line 84 and body 85, the head 87 is caused to lodge in a socket recess in the chamber 88 above the top edge of the entrance opening. The head 87 will remain in the socket recess until the hoist line 84 is slackened sufficiently to permit intentional withdrawal of the head. Thus, when there is even a slight tension on the hoist line 84, the head 87 will be held thereby against separation from the body 85 and should the hoist line fall slack when the bucket 30 is at rest, the socket body may tip over so that the head 87 is held in its socket by gravity whereby to maintain the connection. However, an intentional separation can be easily and quickly effected as desired. This is of particular value where, after the truck has been loaded and must be driven to a place selected for dumping the load, the scraper bucket 30 can be quickly disengaged from the hoist line 84 and left at the site of the scraping operation until the empty truck returns to resume the scraping and loading. To this end, the quick separable coupling 45 for the drag line 31 may be of identical construction as the hoist line coupling 85, 87, just referred to.

The socket body 85 of the hoist line coupling is preferably secured over substantially the center of gravity of the bucket 30 in such a manner that the filled bucket can be readily tipped for discharging its contents into the truck body 27. For this purpose, trip mechanism 90 (Figs. 1, 3 and 9) is provided in association with the hoist line coupling for normally holding the bucket horizontal when hoisted, but permitting the bucket to be released to tip down and discharge its contents by gravity. The trip mechanism 90 includes an upwardly opening elongated channel-shaped retainer 91 which is rigidly supported in longitudinally centered relation over the bucket by means of a rear bracket 92 and a front bucket-straddling bail 93 at a sufficient height to afford effective loading clearance for the bucket. The retainer 91 extends substantially rearwardly from the center of gravity and to a lesser extent forwardly therefrom and has normally positioned therein a trip bar 94 which is only slightly shorter and has its rear end pivotally secured as at 95 between the upright flanges of the retainer in such manner as to enable approximately 180° swinging movement of the bar. An upstanding rigid attachment ear 96 on the trip bar 94 affords an anchorage for the coupler socket 85. The ear 96 may be elongated longitudinally of the trip arm and formed with a longitudinal series of coupler pin holes 97 for selective attachment of the coupler 85 with respect to the center of gravity of the bucket.

At its forward end, the trip arm 94 carries an anti-friction roller 98 which is normally adapted to be engaged by a latch finger 99 carried for swinging movement into and out of latching engagement by a rock shaft 100. An upstanding pair of spaced parallel supporting ears 101 at the forward end of the retainer 91 provide bearings for the shaft 100. Normally latching engagement of the latch finger 99 with the roller 98 is maintained by a torsion spring 102 which is coiled about the rock shaft 100 and has a leg 103 (Fig. 3) anchored in one of the ears 101 while a leg 104 at the opposite end of the spring bears against the forward face of the latch 99 to urge it normally rearwardly into position for engaging the trip bar roller 98. An upwardly extending release finger 105 is rigidly associated with the latch finger 99, engageable with a stop 107, which limits the inward tilting movement of the latch 99 under the influence of the spring 102.

A trip line 108 is secured at one end to the upper end of the trip finger 105 and leads back through an upstanding guide loop 109 at the rear of the retainer 91 for convenient manipulation by the bucket attendant who may pull it at will for swinging the latch 99 against the action of the torsion spring 102 and thus releasing the trip bar 94. The weight of the bucket 30 and contents thereupon causes the trip bar 94 to swing down at its rear end and up at its forward end about the hoist line coupling pivot, and the bucket to swing down about the offcenter pivot 95 with the bucket mouth hanging down to discharge its contents, substantially as seen in the left hand dot-dash position of Fig. 2.

To reset the trip mechanism 90 after the bucket has been returned to scraping position, the trip bar 94 is jackknifed back into the retainer 91 whereby the roller 98 rides against the latch 99, clearing the latch from its path and then allowing it to snap into latching position when the arm has fully returned into the retainer.

Means is provided for automatically operating the hoist line cable 84 in response to movements of the truck 26 not only for hoisting the scraper bucket 30 to loading height above the truck body 27, but also for returning the bucket to the scraping and material-gathering position at ground level beside the truck. Herein such means comprises a peripherally flanged or grooved reel or winding drum 110 mounted coaxially upon the rear truck wheel 28. The pulling end of the hoist cable 84 is secured to the winding drum 110 by extending it through a radial opening 111 in the drum periphery (Fig. 16) equipped with an easement piece 112 within which the cable end is secured by means of a cable clamp 113.

In the present instance, the cooperative association of the drum 110 with the wheel 28 is such that in the forward rotation of the wheel 28 the drum may follow and the hoist line cable 84 be payed out, while in the reverse or backing up rotation of the wheel the drum may also follow and reel the cable in. After the cable is fully payed out, forward rotation of the wheel may continue independently of the drum while the bucket 30 is dragged forward to scrape up a load of material.

The circumferential dimension of the drum 110 is so correlated with the effective length of the hoist cable 84, that as the cable is reeled in upon backing up of the truck after a scraping run, all slack is gradually taken up until the fairlead pulley 82 and the boom head 74 come into vertical position over the bucket 30 where it has come to rest (see the intermediate dot-dash position of Fig. 2). Then in the continued reverse movement of the truck and reeling in of the hoist line 84, the bucket will be raised from the ground and gradually lifted up until it clears the side of the truck body 27. By then swinging the boom 67 inwardly from its overside position, the hoisted bucket can be moved into the desired loading position to be unlatched for discharging its contents into the truck (see left-hand broken line position of Fig. 2 and broken line position of Fig. 3). Thereafter the empty bucket is returnable to the ground level scraping position, by swinging of the boom 67 back to the overside position and driving of the truck forwardly to pay out the hoisting cable 84. Since, in returning the bucket 30, the same amount of hoist cable is payed out as was reeled in for hoisting it, the bucket will return to substantially the same spot from which it was raised, as the truck moves forwardly in the same path. As a result, scraping of the ditch 29 will progress continuously and without a gap even though periodically interrupted by loading of the scraped up bucket contents into the truck.

In the hoisting and swinging of the bucket 30 over the truck body 27, complete freedom from any retarding influence by the relatively short drag line 31 is assured by sliding of the shackle ring 45 up the tie rod 35, as indicated in the left-hand broken line position of Fig. 2.

A guide pulley in a tackle block 114, pivotally anchored to a rigid upstanding ear 114a at the adjacent outer end of the mounting frame bar 34, guides the hoisting cable 84 substantially straight onto or off of the winding drum 110 despite the relatively wide swing executed by the boom head 74 and the block 82 in the course of operation.

In order to space the winding drum 110 sufficiently axially from the wheels to afford adequate clearance for the windup reach of the cable 84 beyond the edge of a wheel fender where present, or a tool box carried by the truck, or other laterally projecting part, the drum is preferably mounted upon a substantially cup-shaped extension flange structure 115 (Figs. 3, 7 and 15) which is removably secured as by means of cap screws 117 to an adapter flange structure 118. The latter, in turn, may be removably bolted to the hub of the wheel 28 by the lug bolts (not shown) of the wheel. This arrangement facilitates mounting and dismounting of the winding drum. When desired, the drum structure may, of course, be mounted upon the opposite rear wheel of the truck, all components being readily reversible as to operation.

Projecting axially outwardly from the base of the extension flange 115 is a spindle or axle 119 upon which is removably mounted a ball bearing 120 held in place thereon by a snap ring 121 fitting in a peripheral groove 122 in the forward end portion of the axle. Fitted onto and rotatable with the outer race of the bearing 120, is an annular housing block 123 to which the drum 110 is adapted to be removably secured through the medium of cap screws 124 extending through the overlapping margins of a hub-hole closure plate 125 and a radial body disk plate 126. These plates may be secured together permanently as by welding. The diameter of the body plate 126 is substantially less than the inner diameter of the drum 110 proper, but is greater than the diameter of the extension flange 115 and carries about its edge an inwardly extending cylindrical flange or inner closure drum 127 which is of sufficient width to overlap the edge of the base of the extension flange in slightly spaced relation in order to enclose a relatively protected mechanism chamber 128 in the space between the flange base and the body plate. Spokes 129 support the drum 110 in rigid concentrically spaced relation to the inner closure drum 127. Through this arrangement, the extension flange 115 at all times rotates with the wheel 28 while the drum 110 is adapted by the bearing 120 for independent rotation, or, to put it another way, is rotatably independent of the extension flange and wheel.

Optional interconnection of the drum 110 and the extension flange 115 to effect rotation of the winding drum with the wheel, in this instance in response to reverse rotation of the wheel, while preserving the rotative independence of the winding drum in the opposite rotation of the wheel, is attained through the medium of a one-way clutch arrangement such as a pawl 130 engageable with a peripherally toothed ratchet ring 131 (Figs. 15 and 16). The pawl 130 is mounted upon the body plate 126 within the chamber 128 upon a fixed pivot pin 132 which may be secured to the inside face of the plate 126 as by having a reduced diameter threaded end 133 extending out through the body plate preferably adjacent the normally uppermost point thereof and secured in plate by a nut 134. A leaf spring 135 carried by the pawl bears against the adjacent inner face of the closure drum 127 and normally urges the pawl 130 toward the toothed periphery of the ratchet ring 131. The latter is mounted for normal rotation with the wheel 28 by being secured to the extension flange 115.

By preference, the mounting of the ratchet ring 131 includes an overrun safety release structure which in emergency will permit the ratchet ring to have a relative rotative movement opposite to that of the supporting vehicle wheel. Accordingly, the ratchet ring is internally dimensioned to fit in spaced concentric relation about the bearing housing 123 near the body plate 126 and is formed with a concentric reduced diameter inner radial shoulder 137 which is turned to a running fit with the inner edge of an annular angle 138 fixedly secured as by cap screws 139 to the base of the extension flange 115. Interposed between the adjacent face of the angle 138 and the face of the ratchet ring 131 is a friction ring 140. Bearing against the directly opposite face of the angle 138 is a similar friction ring 141. A clamping ring 142 bears against the friction ring 141 and is drawn up tight toward the ratchet ring by such means as follow cap screws 143 to place the interposed friction rings and angle flange under selectively adjustable compression. This provides a constant friction clutch which is auxiliary to the pawl-ratchet clutch. The heads of the screws 143 are preferably countersunk within the outer face of the ratchet ring 131 and are accessible by a hexagonal wrench through one or more coaxial wrench holes 144 in the body plate 126. The clamping ring 142 may be slightly dished on its clamping face so as to exert a somewhat flexible pressure when drawn tight.

As a result of this arrangement, the ratchet ring 131 is normally held quite firmly for rotation with the associated wheel of the vehicle. Should there be any extraordinary resistance to turning of the winding drum 110 when clutched for joint rotation with the vehicle wheel, the torsion in the ratchet ring 131 may overcome the frictional resistance of the friction rings 140 and 141 and slip, thus relieving the drum structure from damaging overload strain. This feature might be called into play by accidental over-running of the truck after the hoisting cable 84 is wound to the limit upon the drum 110, thus developing an excessive tension which must be relieved, or by accidental over-accelerated backing up of the truck, effecting a sudden jarring engagement of a tooth of the ratchet ring with the pawl 130. However, the latter condition will ordinarily never be very pronounced, because, as seen in Fig. 16, the ratchet teeth are preferably fairly closely spaced so that only a small fractional reverse rotation of the wheel is necessary to effect interengagement of the pawl 130 and the next engageable tooth.

In order to permit simple and convenient declutching of the drum 110 for free transit travel or backing up of the associated truck, the pawl 130 is preferably mounted for sliding movement longitudinally of the pivot pin 132 into and out of a neutral position. As seen in Figs. 15 and 17, the pawl 130 is shown in full line in the active or clutching position and in broken outline in the neutral position, wherein the pawl has been shifted adjacent to the end of the pivot pin 132 out of engagement with the ratchet ring 131. For this purpose, the friction clutch angle 138 affords a neutral space to receive the pawl 130.

Shifting of the pawl 130 between the active and inactive positions is effected manually through the medium of a fixedly associated handle rod 145 which projects out through the closure drum 137 through a clearance aperture 147 between a pair of the spokes 129. A keeper plate 148 is removably and reversibly secured over the aperture 147 by means of cap screws 149 and has a substantially U-shaped slot 150 (Fig. 17) through which the handle 145 projects. The legs of the keeper slot 150 extend in the direction of the normal rocking of the handle 145 under the influence of the leaf spring 135 working against the pawl, and are spaced apart for respectively retaining the handle 145 against displacement longitudinally of the pivot pin 132 out of either of the optional active or inactive positions of the pawl. In order to effect a shifting of the pawl, the handle 145 may be digitally engaged and rocked in opposition to the tension of the leaf spring 135 to clear the slot leg in which it happens to be engaged, whereafter the handle is pushed through the lateral connecting portion of the keeper slot 150 and allowed to snap into place in the remaining leg of the slot. The length of the clutch-in leg of the keeper slot is, of course, sufficient for free rocking of the handle 145 without dislodgment as the pawl 130 rides over the respective teeth of the ratchet ring 131. The neutral leg of the slot is preferably shorter whereby to hold the neutralized pawl out of contact with the shoulder of the angle 138 and avoid possibly damaging friction in transit.

Thus it will be seen that the winding drum may be quickly clutched or declutched. When clutched, the pawl 130 and the ratchet ring 131 interengage upon slight reverse movement of the wheel 28 for effecting joint rotation of the wheel and the winding drum 110. Upon forward rotation of the wheel, the drum 110 may rotate jointly therewith until the cables are unwound, the pawl and ratchet wheel being held interengaged by the tension of the cables. As soon as the cables are fully unwound, the winding drum is held substantially stationary by the cables while the wheel continues forward rotation, and the pawl slides freely over the ratchet teeth. It will be apparent, of course, that the winding drum 110 may be held, if desired, in any degree of windup and the truck driven forwardly, the clutch in such case preferably being neutralized to save it from wear. One way in which the drum can be thus held is by locking the cables against unwinding by means of any appropriate clamping or tying means secured through the spokes 129 and over the wound cables within the reel-channel of the drum.

Automatic means coordinated in operation with the hoisting cable 84 is provided for swinging the boom 67 into loading position over the truck body 27 as the bucket 30 is hoisted. Herein such means comprises a swing line such as a cable 151 (Figs. 1, 3 and 7) which, adjacent to one end, is secured either directly to the boom 67 (as shown in full outline in all views) or within the grooved periphery of the bull wheel 68 (dot-dash outline position of Figs. 3 and 7).

Where the swing line is secured directly to the boom 67, it is preferably engaged by a cable clamp 152 carried by a link plate 153 which pivotally engages a fixed shackle 154 mounted approximately two-thirds of the way up the fairlead side of the boom. Initially the swing line cable 151 may be longer than required for wear replacement, and the reserve length of cable is inserted through an opening 155 in the adjacent wall of the hollow boom to hang out of the way within the interior.

From the boom, the swing line cable 151 extends to substantially the opposite end of the mounting frame of the loader unit, where it passes over a pulley in a tackle block 157 which is anchored to a fixed upstanding ear 158 on the front mounting frame bar 33. Thence the swing cable extends back toward and beyond the derrick end of the mounting frame through the pulley of a lead block 159 pivotally anchored to an upstanding rigid ear 160 on that end of the mounting frame bar 33.

Herein it is contemplated that the winding drum 110 also serve to actuate the swing cable 151, and for this purpose the pull end of the swing cable is secured to the drum by means of the cable clamp 113 (Fig. 16). Engagement by the clamp is preferably effected close to the extremity of the cable so that as the adjacent stretch of the cable shows wear due to flexure and windings, the worn part may be cut off and replaced by the next succeeding stretch by drawing upon the reserve provided at the boom end of the cable.

Since it is necessary that the scraper bucket 30 be hoisted up for ample clearance of the side of the truck body 27 before the boom 67 is swung toward the truck loading position, the relationship has been so devised that in the wind-up rotation of the drum 110 the cable 151 will remain slack or at least exert no boom swinging pull until the hoisting cable 84 has been sufficiently wound onto the drum to accomplish the preliminary hoisting of the bucket. To this end, the two cables engage the drum tangentially at diametrically opposite sides, with the hoisting cable on that side (herein the top) of the drum where the wind-up rotation of the drum (counterclockwise as seen in Fig. 16) will be instantly effective to reel in the hoisting cable 84. On the other hand, the swing cable 151 approaches the drum tangentially in the same direction as the hoist cable but on the diametrically opposite side of the drum. The anchoring aperture 111 and the cable clamp 113 are located at approximately the tangential meeting of the swing cable 151 and the drum 110 so that the swing cable will actually be slackened off for a quarter wind-up revolution of the drum, and the slack-off will then be retracted in the succeeding quarter revolution. Thus reeling of the swing cable 151 (dot-dash position, Figs. 2 and 16) will commence only after a full one-half of the initial wind-up revolution during all of which time the hoisting cable has been continuously reeled in.

Since for practical reasons the diameter of the winding drum 110 must be relatively limited, the half revolution lag in operation of the swing line 151 may not afford sufficient differential to permit ample raising of the bucket 30 before the boom 67 is caused to swing. Means is therefore provided for appropriately prolonging the lag by increasing the differential in the cables. Such means herein comprises a take-up pulley within a tackle block 161 (Figs. 1, 3 and 10) over which the swing cable 151 is slack looped intermediate the blocks 157 and 159. A flexible take-up element such as a heavy cord or cable 162 supports the block 161 and is trained over a pulley 163 mounted for rotation about a horizontal axis on a shaft 164 (Fig. 4) supported in centered relation adjacent to the upper end of the forward derrick strut 53.

A counterweight 165 secured to the take-up cable 162 is slidable up and down along the front of the strut 53 and is held against lateral displacement therefrom by such means as spaced parallel wing plates 167 (Fig. 6) which project therefrom at opposite sides of the strut and carry removable retaining pins 168 at the rear of the strut. The counterweight 165 acts normally to pull the tackle block 161 up and thus take up any slack that may tend to be present in the swing line 151, including such slack as develops during the first quarter initial wind-up revolution of the winding drum 110. Then in the second quarter of the initial wind-up revolution the first quarter slack off is reeled in. As the winding drum continues reeling in, the normal slack loop in the swing line is taken in to an extent predetermined by a limiting stop member 169 (Figs. 6 and 10) which is engaged by and stops the counterweight 165 after predetermined slack take-up and arrests further paying out of the takeup cable 162 (broken outline position of Fig. 10). The stop member 169 may be a bolt selectively secured in any one of a vertical series of stop bolt holes 170 formed in the web of the front strut 53.

Up to the time that the counterweight 165 is halted by the stop bolt 169, the boom 67 is held by a yieldable trip latch 171 fixedly against swinging movement, thus anchoring the swing line 151 sufficiently to permit pulling up of the counterweight 165 in response to the reeling in of the swing line. Thereupon the increased tension overcomes the trip latch 171 and releases the bull wheel 68 for rotation. Continued reeling in of the swing line 151 then results in swinging of the boom 67 into loading position over the truck body 27 (broken outline position at the left of Fig. 2 and in Fig. 3).

Having particular reference to Figs. 11, 12 and 13, the boom latch 171 in the present instance comprises a latch dog 172 adapted to engage latchingly within an aperture 173 appropriately located adjacent to the rim of the bull wheel 68. The dog 172 is formed as an integral downward heel extension of a bell crank trip lever 174 which is pivotally mounted for vertical rocking movement upon a short horizontal stud shaft 175 adjacent the end of the horizontally extending leg. An angular bracket 177 is mounted upon the spaced center frame bars 81 and overlies the margin of the bull wheel 68 for supporting the stud shaft 175. The remaining, vertical leg of the trip lever 174 extends upwardly and is formed with a bifurcation or pulley yoke 178 within which is rotatably mounted a guide sheave 179 under which the swing cable 151 is trained.

By virtue of having the latch pulley 179 as nearly as practicable directly under the slack takeup pulley 161, a pull exerted upon the swing cable 151 while it is being reeled onto the winding drum 110, is substantially directly effective in tending to rock the trip lever 174 upwardly for releasing the latch dog 172. However, in order to restrain such rocking of the trip lever 174 until all of the differential slack in the swing line 151 has been reeled in by the winding drum, a tension spring 180 is secured at one end to an outstanding integral ear 181 adjacent to the upper end of the vertical sheave yoke 178 and at its opposite end to fixed cantilever 182 on the supporting bracket 177. The spring 180 is of a tension predetermined to hold the trip lever 174 down in latching position to the limit of the differential slack takeup. Thereupon the spring 180 yields under the increased tension and consequent upward pull by the swing line, and the latch dog 172 leaves the latching aperture 173. Upward rocking of the trip lever 174 is limited by a fixed horizontal limit pin 183 which extends through a vertically elongated limit pin slot 184 in the heel portion of the lever.

Since the latch 171 is maintained under constant tension by the spring 180, relaxing of the swing line 151 results in prompt return of the latch dog 172 into latching position, the dog riding upon the upper face of the bull wheel 68 until it again registers with the latch aperture 173. For convenience in accommodating the bull wheel to use of the derrick at the left side of the truck, an auxiliary latch aperture 173ᵃ may be provided in the bull wheel a quarter turn removed from the aperture 173 and adjacent the opposite end of the proximate mounting flange 69.

Immediately following unlatching of the bull wheel 68, the full pulling effect of the swing line 151, as it continues to be reeled in, is exerted in swinging the boom 67 toward the loading position. The nature of the swing line system is such that there is a reasonably smooth transition from the slack to the boom swinging condition thereof, the inertia of the boom and the loaded bucket 30 offering considerable resistance to sudden or jerky initial swinging movement of the boom as the full swinging pull of the swing line 151 becomes effective.

As the boom swings around into position over the truck body, return-swinging means, such as a spiral torsion spring 185 (Figs. 10 and 11) is loaded. This spring should be of a weight and length carefully selected to afford adequate resistance and continuous service for this particular purpose. As shown, the spring 185 is coiled around the base portion of the stationary mast post 42 and has its inner end fixedly secured to the mast while its outer end is secured to one of the boom supporting brackets 69. The arrangement is such that as the boom swings from the overside position toward the loading position, the spring 185 is gradually loaded, and as its tension increases it serves as a restraining medium or brake upon possible overtaking acceleration of the boom relative to the swing line 151. This aids in maintaining the swing line taut.

After the bucket has been dumped, and the swing line 151 is relaxed by forward running of the truck for return of the loader to the scraping position, the recoil of the loaded torsion spring 185 functions to return the boom to its overside position.

As a safety measure, swinging movement of the boom 67 in either direction is positively limited. For this the bull wheel 68 may be equipped with a removable radially projecting stop dog 186 disposed in the vertical median plane under the boom and engageable with vertical stops 188 and 189 located on the base frame bars 59 and 60, respectively, at opposite sides of the wheel. The disposition of the stops is preferably such as to afford a 180° swinging range for the boom. In this way the limit of extreme inward swinging movement of the boom is defined by engagement of the dog 186 with the stop 188 and overside swinging movement is limited by engagement of the dog with the stop 189. While the latch 171 normally stops and retains the boom at about 45° rearwardly in the overside position, manual withholding or neutralizing of the latch will permit full or perpendicular overside swinging of the boom to the limit of the stop 189, if desired. An alternative land 187 may be formed on the bull wheel 68 for attachment of the dog 186 upon reversal of the boom for use at the opposite side of the truck.

Should the truck accidentally completely overrun in reverse incidental to hoisting, dangerous tension might be created in the swing line cable 151 after the boom has reached the extreme limit of its inward swing as determined by the stop 188. Therefore, an overrun safety release device is provided, preferably in association with the slack takeup cable 162 (Figs. 4, 5 and 6), which in such event will allow the swing line cable 151 to fall slack. To this end the slack takeup cable 162 at all times, even after being arrested in its differential yielding function, maintains a substantial reserve loop in the swing line 151 (see dot-dash position of Fig. 10). Then if the swing line becomes over-taut, the slack takeup cable 162 is automatically released from the counterweight 165, allowing both the counterweight and the pulley block 161 to drop with an audible warning clatter, and completely relieving the swing line 151.

In a preferred form, the automatic safety release connection for the slack takeup cable 162 with the counterweight 165 comprises a knob-like ferrule 190 which is adjustably secured to the weighted reach of the takeup cable by such means as a set screw 191 and is adapted to receive the weight of the counterweight 165 directly thereagainst. For this purpose, the counterweight 165 is formed in two parts held apart by identical spacer plates 192 defining a vertical passageway through which the supporting ferrule 190 may pass. In assembly, a pair of anti-friction rollers 193 carried by the lower ends of a pair of convergently related straight lever arms 194, project into the path of the ferrule 190 at the lower end of the vertical passageway and engage an obtusely tapered frusto-conical seat 195 at the upper end of the ferrule. The arms 194 extend upwardly and outwardly from the ferrule passageway under the lower foreshortened ends of the respective spacer plates 192 and bear against outwardly beveled shoulders 197 formed at such ends of the plates. In this position, the arms 194 are rockably and longitudinally shiftably supported by respective fixed horizontal pins 198 which extend through short longitudinal slots 199 in the arms. Under normal conditions the arms 194 are urged longitudinally toward convergence within the vertical passage to the extent permitted by the pins 198, and tight against the respective limiting shoulders 197, by resilient means such as bar springs 201, engaging against their upper ends. As best seen in Fig. 5, the springs 201 are preferably of angular or bell crank shape engaged within their angles by fixed transverse pins 202 closely adjacent to the respective spacer bars 192. One leg of each of the springs 201 extends outwardly and bears resiliently downwardly against an outwardly eccentric bearing heel 203 at the upper end of the associated holding arm 194. The other leg of each of the springs 201 extends upwardly adjacent an outwardly tilted upper portion 204 of the associated spacer bar which carries a tension adjusting set screw 205 directed outwardly against such leg.

In response to an excessive or overload pull on the slack takeup cable 162, the supporting ferrule 190 forces the retaining arms 194 axially upwardly out of its way from the normal full line position shown in Fig. 5 toward the coaxial dot-dash position, in opposition to the bar springs 201, until, if the overload increases beyond the safety point, the ferrule rides up between the rollers 193 and passes up through the counterweight. The arms 194 are, of course, promptly snapped back into normal position. It will be observed that due to the obtuse character of the seat 195 and the direct opposing thrust of the bar springs 201, resistance to release of the holding ferrule 190 will be quite substantial and not readily overcome by ordinary jarring or occasional momentary excessive pull on the slack takeup cable 162, but a sustained overload pull will operate the safety release.

In order to permit quick and easy resetting of the safety release, the ferrule 190 is formed with a sharply tapered frusto-conical lower nose 207 which enables the ferrule to be drawn back into the reset position past the roller ends of the arms 194 by riding of the rollers 193 onto the nose 207 whereby to cause the arms 194 to rock about their pivot pins 198 and spread as indicated in the eccentric dot-dash position of Fig. 5. In view of the gradual taper of the nose 207 and the relatively long leverage of the lower portions of the arms 194, the resistance to resetting is quite nominal. In a typical example, it requires approximately fifty times as much force to effect an overload release as is required to reset the device. To facilitate resetting, a substantial hand hold length of the takeup cable 162 extends beyond the lower end of the ferrule 190.

Proper functioning of the boom 67 requires that the mast 42 be as nearly vertical as practicable and that any slight tilting thereof from the vertical assist rather than hinder its proper functioning. That is, a slight outward tilting of the mast may be utilized in place of or in supplement to the torsion spring 185 for normally return swinging of the boom. Where such outward tilting is excessive, however, the boom will be swung too far off balance. On the other hand, where the boom tilts inwardly or away from the side of the truck at which scraping is in progress, the over-balance will be such as to cause the boom constantly to tend to swing in over the truck and thus prevent or impede return swing. Such over-tilting of the mast becomes a particular problem in working upon super-elevated road curves or in other circumstances where the truck is tipped appreciably on its longitudinal axis from a normal substantially horizontal plane. Means is, therefore, provided to compensate for necessary sidewise tilting of the truck during operation by optionally adjusting the mast 42 to assume as nearly as practicable the preferred vertical working position. With particular reference to Figs. 7, 10, and 14, such verticality adjustment means is arranged for rockably tipping the derrick base frame 55 up or down from a normal horizontal plane about the axis provided by the rock shaft 64. To this end the shaft 63 is equipped with a pair of circular eccentric cams 210 which are removably keyed in place as by means of set screws 211 and slidably engageable between spaced horizontal follower ears or dogs 212 projecting rigidly from the inner faces of the adjacent end portions of the base frame bars 57 and 58, respectively. By rotation of the shaft 63 and thus the eccentric cams 210, the associated end of the base frame 55 can be moved from the normal horizontal full line position as shown in Fig. 14 to the up or down tilted positions shown in respective dash and dot-dash outlines, or into incremental intermediate up or down tilted positions. Since the shaft 63 remains on a permanent axis with respect to the mounting frame bars 33 and 34, the base frame bars 57 and 58 are provided with vertical clearance slots 213 to accommodate the shaft.

Manual locking of the cam shaft 63 may be effected through the medium of a handle 214 (Figs. 3, 7 and 14) the grip portion of which is of hollow tubular construction and carries a resiliently projected, retractible index pin 215 adapted to engage within any one of a semicircular series of index holes 217 within an index plate 218. The latter is of preferably sector shape and assembled upon the shaft 63 between the shank of the handle 214 and the adjacent edge of the base frame bar 34. There the index plate is held non-rotatable by one or more interlocking blocks 219 fitting within the channel of the frame bar 34. The arrangement of the handle 214 relative to the eccentric cams 210 is preferably such that when the handle is in an upright position as shown in full outline in Figs. 7 and 14, the base frame 55 is located in the normal horizontal or parallel relation to the mounting frame, while when the handle is moved to the left as shown in Fig. 7, the adjacent end of the base frame 55 is depressed, and, conversely, when the handle is moved to the right, such end of the base frame is raised, the mast 42 being correspondingly tilted.

Rather than to adjust the verticality of the mast, it may be desired to tilt the mast 42 slightly in order to increase the swinging tendency of the boom 67 either to the overside position or toward the loading position. This may, of course, be effected by appropriate cam adjustment to the right or to the left, respectively, by appropriate indexing of the handle 214.

When the truck loader 25 is trimmed for transit travel of the truck 26, with the derrick collapsed or with the boom 67 at least depressed as shown in dot-dash outline of Fig. 7, the bull wheel 68 is preferably immobilized in its most convenient rotative position with regard to the transit position of the boom by such means as one or more immobilizing pins (not shown) which may be extended through any one of a series of pin holes 220 (Fig. 11) provided for this purpose in the bull wheel 68 with the pins engaging some convenient part of the base frame structure. At the same time the hoisting cable 84 and the swing cable 151 are tied down to hold the declutched winding drum 110 immobile, and the scraper bucket 30 is supported within the truck body 27 as indicated in dot-dash outline of Fig. 7. At such time the adjacent portion of the hoisting cable 84 may be engaged behind a friction clamp 221 which may be conveniently mounted within the channel of the rear mounting frame bar 34. Upon arrival at the scene of operation, the loader can then be quickly placed in the operative condition.

When dumping the truck by rearward tilting of the truck body 27, dismantling or collapsing of the derrick structure of the loader is unnecessary due to its relatively light weight and compact construction and the stationary locked condition of the boom 67.

Figure 19:
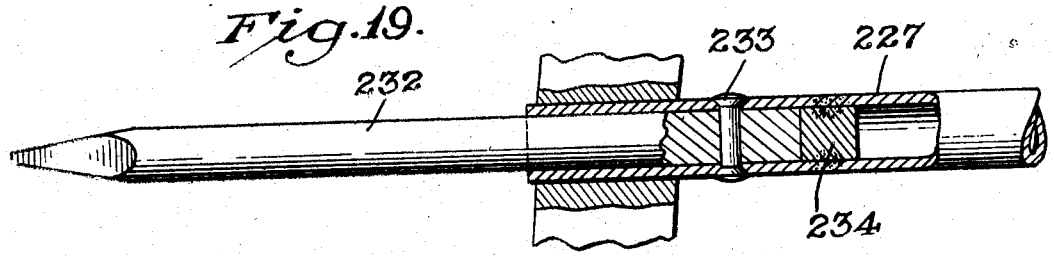
Fig. 19 is an enlarged sectional detail view taken along line 19—19 of Fig. 18, showing the mounting of one of the tines of the rock fork.

Difficulty has been encountered in ditching with the imperforate scoop or bucket 30 in rocky slides containing rocks from about four inches up to substantially larger size boulders. For handling such material efficiently, I have provided a rock fork 225 (Fig. 18) which may be optionally substituted for the bucket 30 and comprises a strongly reenforced open frame construction. There are, of course, many other material-handling uses for which this fork is suitable. To attain light weight with maximum strength, the main body of the fork 225 is constructed of appropriately shaped longitudinally extending tubular bars 227 which may consist of a standard type tubing. These are rigidly secured into a unitary structure by means of tie plates 228 and a rear frame bar structure 229 from which extends rearwardly a handle 230 held rigid by a yoke 231. The forward ends of the body tubes 227 form sockets within which are inserted forwardly projecting hardened steel tines 232 (Fig. 19) secured in place by means such as soft rivets 233 and rearwardly abutting against base plugs 234 which may be welded in position at the proper depth within the tubes. When necessary, the tines 232 may be removed and replaced by the simple expedient of driving out the soft rivets 233. Fixed clevices 235 may be provided at the outside of certain of the body members 227 for attachment of the drag line to the fork.

For quick detachable connection with the hoist cable 84, the fork 225 carries a socket body 237 pivotally mounted on an upstanding longitudinal vane 238 located over substantially the center of gravity of the fork and rigid with a triangular latch frame 240. The vane 238 is provided with a longitudinal series of apertures 239 enabling selective attachment of the socket 237 longitudinally with respect to the center of gravity so as to predetermine the normal uptilt or lack of tilt of the fork when suspended from the hoist cable.

The latch bar frame 240 is supported in normally spaced parallel relation to the body bars 227 by a cantilever type of supporting frame 241 which is of a substantially complementary A-shape in plan, and of substantially L-shape in side elevation, with the ends of the short leg portions thereof rigidly secured to the rear framework 229 and the sides of the yoke 231. At its rear or wider end, the trip latch frame 240 is pivotally secured to the supporting frame 241. At the forward end the trip latch frame is associated with a manually operable latch structure 242 which is in essential respects similar to the latch structure described in connection with the scraper bucket 30 and normally holds the same down on the supporting frame 241 but is readily tripped for dropping the mouth of the fork down to discharge its contents. If desired, of course, the frame structure assembly 240, 241 could be used on the bucket 30 in substitute for that shown.

While I have illustrated a preferred embodiment of my invention, many modifications and substitutions may be made without departing from the spirit of the invention, and I do not wish to be limited to the precise details of construction as set forth, but desire to avail myself of all changes within the scope of the appended claims. In the claims, the term "cable" is used in a generic sense to include such equivalents as chain or rope.

Having thus described my invention, what I claim as new and desire to secure by Letters Patent of the United States is:

1. Truck loading apparatus comprising, in combination, a supporting structure adapted to be mounted upon the body of a truck and including a boom arranged to extend upwardly and outwardly beyond one side of the truck body and to swing into position overhanging the body with the top of the boom substantially spaced thereabove, a scoop device having a drag line arranged to extend forwardly therefrom, a drag bar extending laterally from one side of the truck and carried by the supporting structure, said bar having the forward end of said drag line secured adjacent its outer end, a hoisting cable secured at one end to said scoop and supported by the boom to be pulled for hoisting the scoop device, a winding drum carried by the adjacent rear wheel of the truck and arranged to rotate with the wheel when the truck is driven in one direction for winding up said hoisting cable to raise the scoop device but to rotate with the wheel when the truck is driven in the opposite direction until the cable is unwound and thereupon to permit free rotation of the wheel relative thereto while the truck is driven on to effect dragging of the scoop device along the ground through the medium of said drag line and said drag bar, and a swing cable also secured to said drum and operatively connected to said boom for swinging the boom into the overhanging position in coordination with the operation of the hoisting cable.

2. In combination in a truck loading apparatus, a supporting structure, a handling device adapted to engage, at a point outside the truck, a hoisting cable rigged on said supporting structure and attached to said handling device, a drum having said cable secured thereto and adapted to be rotated for winding the cable thereon to effect movement of said handling device from the level at which it is loaded to a level higher than the body of the truck, and a second cable also arranged for winding upon the drum and adapted in such winding to effect movement of the elevated handling device in a generally horizontal direction over the truck body.

3. Truck loading apparatus comprising a supporting structure to be mounted directly upon the truck to be loaded, a handling device adapted to receive at ground level a load to be deposited in the truck, said supporting structure being rigged with a hoisting cable for elevating and lowering the handling device between the ground level and a level higher than the body of the truck, means including a cable for effecting generally horizontal movement of the handling device into position over the truck body for deposit of said load into the truck, and truck-carried rotary structure upon which both of said cables are windable.

4. In combination in truck loading apparatus, a supporting structure adapted to be carried by the truck to be loaded, a handling device adapted to receive a load at ground level to be lifted up and deposited in the truck, a pair of cables carried by said supporting structure, one of said cables being cooperative with said handling device for lifting it from ground level to a higher level than the truck body, the other of said cables being adapted for effecting substantially horizontal movement of the handling device over the truck after the device has been raised sufficiently to clear above the truck body, and a winding drum mounted upon a wheel of the truck and having both of said cables secured thereto, said drum being rotatable with the wheel for winding up the cables and thereby pulling them to effect said lifting and shifting, respectively.

5. Truck loading apparatus as set forth in claim 4, including means comprising a reverse wound portion for maintaining a differential reserve in the device-shifting cable, so that for a predetermined interval in the initial windup of the cables the lifting cable will be pulled to elevate the handling device high enough to clear the truck body before the shifting cable is pulled to shift the device.

6. Truck loading apparatus comprising, in combination, a supporting structure adapted to be carried directly by the truck to be loaded, a handling device adapted to receive, outside of the truck body, a load to be delivered into the truck, means including a cable arranged to elevate the handling device from a load-receiving position below the truck body to an elevation above the truck body, means including a cable for shifting the handling device in a generally horizontal direction into a proper position for delivery of its load into the truck, and truck-carried rotatable wind-up structure having said cables attached thereto, the relationship of the rotatable structure and the cables being such that the elevating cable is wound up to a predetermined extent in advance of winding up of said shifting cable so as to permit elevating movement of the handling device before shifting thereof.

7. Truck loading apparatus comprising, in combination, a supporting structure adapted to be carried directly by the truck to be loaded, a handling device adapted to receive, outside of the truck body, a load to be deposited in the truck, means including a cable arranged to be pulled to elevate the handling device from a load-receiving elevation below the top of the truck body to an elevation higher than the top of the truck body, means including a cable arranged to be pulled for shifting the handling device in a generally horizontal direction into a proper position for deposit of its load into the truck, and a rotary winding drum having both of said cables attached thereto in such relationship that as the drum is rotated to wind up the elevating cable, the shifting cable is paid out during a part of the initial revolution of the drum and is thereafter wound up together with the elevating cable, the paying out of said shifting cable causing it to lag behind the pull of the elevating cable and permitting elevation of the handling device before it is shifted.

8. In combination in loading apparatus including a swingable boom, a load handling device, a cable for swinging said boom, a second cable for hoisting said handling device, and a rotary drum having both of said cables attached thereto and respectively making initial contact with the drum in approximately the same tangential direction at substantially diametrically opposite sides of the drum, so that when the drum is rotated the first said cable will slacken off during the first part of the initial rotation and then begin to wind up on the drum, while the second said cable is wound up continuously from the beginning of rotation, whereby to effect a lag in operation of first said cable with relation to the second said cable.

9. Loading apparatus as defined in claim 8, including means for taking up the slack developed in the first said cable and keeping it taut during the interval in which it slackens off.

10. Loading apparatus substantially as defined in claim 8, in which the drum has a radial opening defined by an inwardly directed easement structure to receive the end portions of both of the cables, and a cable clamp secures the end portions of the cables inwardly of the easement structure.

11. Loading apparatus as defined in claim 8, in which the first said cable has a differential reserve for prolonging the lag in operation beyond that afforded by the slackening off.

12. Truck loading apparatus comprising, in combination, a supporting structure adapted to be mounted directly upon the truck to be loaded, a handling device adapted to engage, outside of the truck, a load to be deposited in the truck, means carried by said supporting structure for raising the handling device from its load-engaging position to a level higher than the truck body, said means including a hoisting cable and a winding drum for such cable mounted to be driven rotatably to wind the cable thereon, means including a cable also arranged to be wound upon said drum for effecting generally horizontal movement of the handling device over the truck body after the device has been sufficiently elevated to clear thereover, said last mentioned cable having a substantial differential reserve with respect to the hoisting cable so that in the winding rotation of the drum the hoisting cable will operate to elevate the handling device before the shifting cable acts to shift the handling device, and means for taking up the differential reserve in the shifting cable arranged to yield during the winding operation of the drum to the extent of the predetermined differential whereafter the full pulling effect upon such cable resulting from windup of the cable upon the drum may become effective for shifting said device.

13. A loading apparatus as defined in claim 12, in which the takeup means includes a counterweight, and means for controlling its range of movement in the yielding of said takeup means, whereby to predetermine the effective extent of differential reserve of the cables.

14. Truck loading apparatus as defined in claim 12, including a latch normally acting to lock the shifting means against shifting operaton, and means responsive to the tension, of shifting cable after said differential has been fully taken up to trip the latch.

15. In combination in loading apparatus including a supporting structure, means for actuating a load handling device including, a swinging boom structure, a swivel member carrying the base of the boom proper, a latch mechanism mounted upon said supporting structure and engageable with said swivel member to lock the boom against swinging out of a given position, an actuating cable having one end cooperating with the boom structure and being adapted to be pulled, for swinging the boom from said latched position, motivating means cooperating with the opposite end of the cable for pulling on the cable, and means intermediately engaging the cable and being movable by the cable when pulled to a predetermined extent to release the latch so that the cable may then swing the boom.

16. Loading apparatus including a supporting structure, a load-handling device, a pair of cables rigged on said supporting structure for actuating said device, means for actuating said cables simultaneously, one of said cables having a differential reserve, takeup means including a cable and a counterweight structure for yieldably taking up said differential reserve to avoid slackness in said one cable, and safety means effecting a connection between said takeup cable and said counterweight structure constructed and arranged to release the takeup cable to fall slack when placed under overload tension by said one cable.

17. In truck mounted loading apparatus of the character described, a material handling device, motivating means for said material handling device including a cable and a winding drum for said cable, and means for mounting said drum upon a wheel of the truck comprising a flange member having one end fixedly secured to and rotatable with the wheel and a second member removably connected to the other end of said wheel mounted member, the drum being rotatably mounted upon said second member.

18. Loading apparatus for actuating a material handling device, comprising means for actuating said handling device including a cable, said cable having, intermediate its ends, a substantial reserve loop, safety means including a slack takeup structure normally maintaining the cable operatively taut and operative when the cable is placed under overload tension to yield said reserve loop and allow the cable to fall slack.

19. In combination in loading apparatus including a material handling device adapted to be dragged along the ground for scooping up material to be loaded into the truck, hoisting structure, including certain rigid components and arranged to be carried by the truck for raising and lowering the scooping device between scooping and truck loading positions, a drag line attached to said scooping device, a drag bar arranged to extend outwardly beyond the side of the truck for dragging the scooping device through the medium of said drag line when the associated truck is driven in the direction of the scooping operation, said drag bar being pivotally mounted adjacent the body of the truck for vertical swinging movement, and a tie rod engaging said drag bar and being adjustably engageable with one of the rigid components of said hoisting structure for holding the drag bar in various selective positions of angular adjustment relative to the side of the truck as permitted by the pivotal mounting of the drag bar.

20. Loading apparatus as defined in claim 19, in which the tie rod is detachable to permit collapse of the drag bar into a vertically hanging out-of-the-way position at the side of the truck when the loading apparatus is not in use.

21. In combination in a truck-carried loader, a material handling device adapted to be dragged along the ground for gathering material to be loaded into the truck, hoisting means for raising and lowering the handling device, a drag line attached to the handling device, a drag bar arranged to extend laterally from the truck, a tie rod extending upwardly from the outer end of the drag bar, and means connecting the forward end of the drag line to said tie rod, the connecting means being slidable upwardly along the tie rod from a position close to the meeting ends of the tie rod and the drag bar when the handling device is raised to a greater distance from said meeting ends than the length of the drag line.

22. In combination in a truck-carried loader, a handling device adapted to transfer a load from ground level into the truck, a derrick structure adapted to be mounted directly upon the body of the truck and including a boom swingable about a vertical axis, a hoisting line supported by said boom for raising and lowering said handling device, means for automatically swinging said boom between an overside position and an overhanging position relative to the truck body in coordinated sequence in the operation of said hoisting line, and means for adjusting the swinging axis of the boom with respect to the vertical to control predisposition of the boom to swing, as affected by the degree and direction of inclination of the axis from the vertical, respectively in supplement to or in opposition to the action of said boom swinging means.

23. In combination in loading apparatus adapted to be mounted upon a dump truck for use in highway maintenance work, a material handling device adapted to be dragged along the ground or a roadside ditch to scoop up material therefrom, means for effecting a drag connection between the handling device and the truck, a derrick structure including a boom swingable about a vertical axis, and rigging carried by the boom for raising and lowering said handling device relative to the truck body, said derrick structure including means for adjusting the swinging axis of the boom with respect to either side of the truck in order to compensate for sidewise tilting of the truck, at super-elevated road curves or the like, and maintain the boom in a substantially balanced swingable condition.

24. In combination in apparatus of the character described, a material handling device adapted to be dragged along the ground for scooping up a load of material to be lifted into a truck, and means for lifting the handling device from the ground into a loading position over the truck, said handling device comprising an open framework body including forwardly opening tubular sockets and hardened tines replaceably seated within the respective sockets.

25. In combination in apparatus of the character described, a material handling device adapted to be dragged along the ground for gathering up a load of material to be lifted into a truck, including a forwardly pointing overhanging cantilever carrying frame substantially A-shape in plan and L-shape in side elevation affording a large forwardly opening material receiving mouth for the device, a trip bar structure of substantially complementary A-shape pivotally secured at its widest end to the wider rear portion of the carrying frame and having means at approximately the center of gravity of the device for attachment of a hoisting cable, and a trip latch mechanism carried by the forward end portions of the carrying frame and the trip bar structure adapted normally to hold them locked together but being releasable to permit the trip bar structure to swing up and the forward end of the handling device to swing down for discharging its contents.

26. In combination in a loading apparatus adapted to be mounted upon the dump body of a truck, a material handling device, a derrick structure including a boom and rigging for raising and lowering the handling device, said boom being adapted to swing between a material pickup position beyond one side of the truck and a loading position over the truck body, means actuated by said rigging and automatically releasable in the operation of the apparatus for holding the boom in the material pickup position for a predetermined interval in the operating cycle, and means enabling locking of the boom in said loading position against return to the material pickup position when the truck is in transit or is to be dumped.

27. In truck mounted loading apparatus of the character described, a material handling device, motivating means for said material handling device including a cable and a winding drum for said cable, and means for mounting said drum upon a wheel of the truck, said means comprising an adapter flange fitting a portion of said wheel and secured thereto for rotation therewith, said adapter flange having a connecting portion of a predetermined size, a supporting flange having said drum rotatably supported at one end thereof and having a connecting portion fitting and removably secured to the connecting portion of said adapter flange, and means selectively connecting said drum to the supporting flange for the transmission of driving force thereto from said wheel.

28. In combination with a truck carried loader, a handling device adapted to transfer a load from ground level into the truck, a derrick structure adapted to be mounted directly upon the body of the truck and including a boom swingable about a vertical axis, said derrick structure also including a mounting from and a base frame carried by the mounting frame, a hoisting line supported by said boom for raising and lowering said handling device, means for automatically swinging said boom between an over-side position and an overhanging position relative to the truck body in coordinated sequence in the operation of said hoisting line, and means for adjusting the swinging axis of the boom with respect to the vertical to control predisposition of the boom to swing, as affected by the degree and direction of inclination of the axis from the vertical, relatively in supplement to or in opposition to the action of the boom-swinging means, said adjusting means comprising a mechanism for tilting the base frame relative to the mounting frame.

ROBERT C. SHOEMAKER.